(12) United States Patent
Miyamae (10) Patent No.: US 11,791,986 B2
(45) Date of Patent: Oct. 17, 2023

(54) UNAUTHORIZED USE DETECTION SYSTEM, INFORMATION PROCESSING APPARATUS, COMPUTER-READABLE RECORDING MEDIUM AND UNAUTHORIZED USE DETECTION METHOD (71) Applicant: FUJITSU LIMITED, Kawasaki (JP)

(72) Inventor: Takeshi Miyamae, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 149 days.

(21) Appl. No.: 17/111,338

(22) Filed: Dec. 3, 2020

(65) Prior Publication Data

US 2021/0211272 A1 Jul. 8, 2021

(30) Foreign Application Priority Data

Jan. 6, 2020 (JP) ................................. 2020-000451

(51) Int. Cl.
*H04L 9/06* (2006.01)
*G06F 9/46* (2006.01)
*H04L 9/00* (2022.01)

(52) U.S. Cl.
CPC ............ *H04L 9/0643* (2013.01); *G06F 9/466* (2013.01); *H04L 9/50* (2022.05)

(58) Field of Classification Search
CPC . H04L 9/0643; H04L 9/50; H04L 9/06; G06F 9/466; G06F 9/46
See application file for complete search history.

(56) References Cited

U.S. PATENT DOCUMENTS

| 2007/0198838 | A1* | 8/2007 | Nonaka | H04L 9/3247 713/176 |
| 2016/0364555 | A1* | 12/2016 | Child | H04L 63/0846 |
| 2018/0064402 | A1* | 3/2018 | Leydon | A61M 15/0021 |
| 2019/0268335 | A1* | 8/2019 | Targali | H04W 12/06 |

FOREIGN PATENT DOCUMENTS

| JP | 2017-204706 A | 11/2017 |
| JP | 2018-147016 A | 9/2018 |
| JP | 2020-046993 A | 3/2020 |

* cited by examiner

*Primary Examiner* — Lynn D Feild
*Assistant Examiner* — Vladimir I Gavrilenko
(74) *Attorney, Agent, or Firm* — Fujitsu Patent Center (57) ABSTRACT

An unauthorized use detection system includes apparatuses and a hash chain that records, for each piece of data, a data structure that includes a hash value of entire data and hash values calculated with respect to a plurality of partial areas obtained from a specific procedure using the hash value of the entire data. One of the apparatuses reads out the data structure associated with the data of one of comparison targets from the hash chain. The apparatus calculates, regarding data of the other one of the comparison targets, hash values of the plurality of partial areas obtained from the specific procedure using the hash value of the entire data included in the read data structure. The apparatus compares the hash values of the plurality of partial areas included in the read data structure with the calculated hash values of the plurality of partial areas related to the other one.

7 Claims, 7 Drawing Sheets

UNAUTHORIZED USE DETECTION SYSTEM, INFORMATION PROCESSING APPARATUS, COMPUTER-READABLE RECORDING MEDIUM AND UNAUTHORIZED USE DETECTION METHOD

CROSS-REFERENCE TO RELATED APPLICATION(S)

This application is based upon and claims the benefit of priority of the prior Japanese Patent Application No. 2020-000451, filed on Jan. 6, 2020, the entire contents of which are incorporated herein by reference.

FIELD

The embodiment discussed herein is related to an unauthorized use detection system, and the like.

BACKGROUND

In recent years, in a data distribution market, there is a disclosed technology for ensuring traceability by concatenating data processing history or data transaction history managed by each corporation to block chains.

Furthermore, there is a disclosed system that that manages, in block chains, databases that store therein a set of hash values of estimated sales data registered by terminals used by sellers and blocks including transaction history. In this system, a terminal used by a verifier detects a hash value that is matched one of the transaction histories from the set of hash values and stores the matched hash value in a block as an unauthorized hash list (for example, see Japanese Laid-open Patent Publication No. 2018-147016 and Japanese Laid-open Patent Publication No. 2017-204706).

However, in the conventional technology, there is a problem in that, when an unauthorized user partially manipulates illegally acquired distribution data and newly registers the manipulated data into the data distribution market, it is not possible to detect an unauthorized use of the data. Namely, when an unauthorized user newly registers, in a block chain, hash values of the illegally acquired distribution data itself, because hash values of the data are the same, it is possible to detect the unauthorized use based on traceability of a block chain technology. However, when an unauthorized user newly registers, in a block chain, hash values of the data in which the illegally acquired distribution data is partially manipulated, it is difficult to detect the unauthorized use because the hash values of the data are different.

SUMMARY

According to an aspect of an embodiment, an unauthorized use detection system includes a hash chain a server. The hash chain records, for each piece of data, a data structure that includes a hash value of entire data and hash values calculated with respect to a plurality of partial areas obtained from a specific procedure using the hash value of the entire data. The server includes a processor; and a memory, wherein the processor executes a process. The process includes reading out a data structure associated with data of one of comparison targets from the hash chain, calculating, regarding data of the other one of the comparison targets, hash values with respect to the plurality of partial areas obtained from the specific procedure using a hash value of the entire data included in the data structure associated with the data of the one of the comparison targets, and comparing the hash values of the plurality of partial areas included in the data structure of the one of the comparison targets with the calculated hash values of the plurality of partial areas related to the other one of the comparison targets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. Furthermore, the present invention is not limited to the embodiments.

First, in a data distribution market, when a data processing history or a data transaction history managed by each company is managed by using a hash chain, a reference example of unauthorized use of data will be described with reference to FIG. 7. Furthermore, the hash chain mentioned here is an element technology of block chains and diverts traceability of block chains by using hash values.

Figure 7:
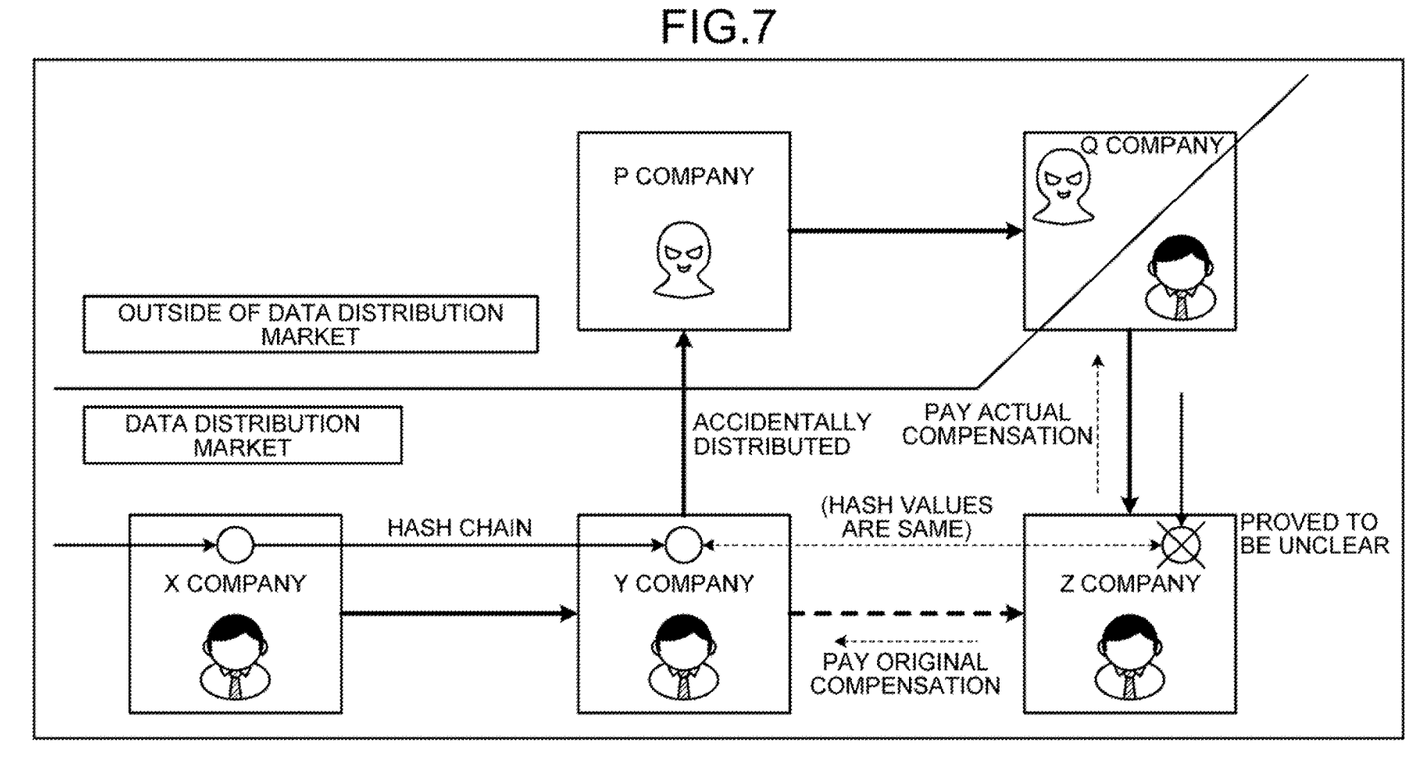
FIG. 7 is a diagram illustrating a reference example of a data unauthorized use.

FIG. 7 is a diagram illustrating a reference example of a data unauthorized use. As illustrated in FIG. 7, an X company or an Y company in a data distribution market registers its data processing history or data transaction history in a hash chain. Here, it is assumed that a P company that is not a producer of the data acquires distribution data of the Y company by a certain illegal way; and a Q company that acquires the distribution data through the P company partially manipulates the distribution data and again registers the distribution data in the hash chain as original data. Furthermore, an example of the certain way includes a case in which a malicious employee of the Y company passes data to the P company or a case in which the P company steals data by a cyber attack or spying. Furthermore, an example of leaked data of the Y company includes statistical data, survey data, a customer list, a predetermined list, and the like.

Then, because the hash value of the original data registered by the Q company is different from the hash value of the original data registered by the Y company, it is difficult to detect unauthorized use by traceability of the block chain technology.

Thus, when a Z company purchases manipulated data by way of the Q company that is an unauthorized user, a compensation is paid from the Z company to the Q company. The Y company that has a right to receive the compensation is not able to receive the compensation and the Q company intercepts the compensation. Namely, it is not possible to detect the unauthorized use of the data when the unauthorized users (the P company and the Q company) newly register, in the data distribution market, data in which actual data of the Y company is partially manipulated with respect to the illegally acquired distribution data.

Thus, in the following, an unauthorized use detection system that can detect an unauthorized use even when unauthorized users (the P company and the Q company) newly register, in the data distribution market, data in which actual data of the Y company is partially manipulated with respect to the illegally acquired distribution data.

Embodiment

Configuration of Unauthorized Use Detection System

Figure 1:
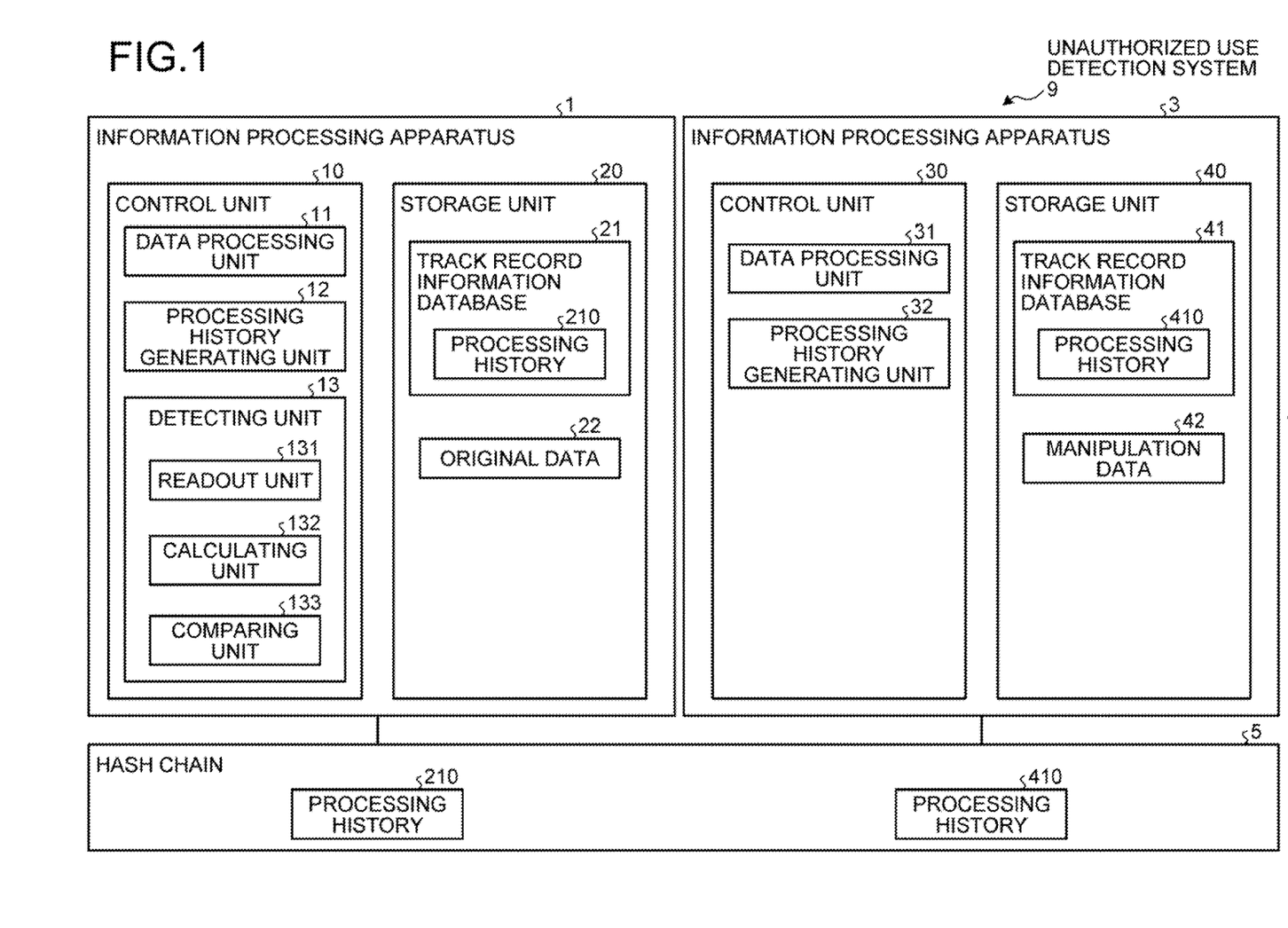
FIG. 1 is a functional block diagram illustrating a configuration of an unauthorized use detection system according to an embodiment.

FIG. 1 is a functional block diagram illustrating a configuration of an unauthorized use detection system according to an embodiment. In an unauthorized use detection system 9 illustrated in FIG. 1, information processing apparatuses 1 and 3 in a data distribution market record, for each piece of data in a hash chain 5, a data structure that includes, hash values with respect to entire data and hash values with respect to a plurality of partial areas of the data that is obtained in accordance with a specific procedure using the hash values. Then, the information processing apparatus 1 that verifies an unauthorized use of data owned by the information processing apparatus 1 reads out the data structure associated with questionable data from the hash chain. Then, regarding the data owned by the information processing apparatus 1, the information processing apparatus 1 calculates hash values with respect to a plurality of partial areas obtained in accordance with a specific procedure that uses hash values of the entire data included in the read data structure. Then, the information processing apparatus 1 compares the hash values of the data owned by itself with the hash value of the questionable data and detects unauthorized use of the data owned by itself.

The unauthorized use detection system 9 includes the information processing apparatuses 1 and 3 and the hash chain 5.

The hash chain 5 is obtained by diverting traceability of block chains by using hash values. In the hash chain 5, processing histories 210 and 410 and a transaction history are stored in the information processing apparatuses 1 and 3. Furthermore, the data structure of the processing histories 210 and 410 will be described later.

The number of the information processing apparatuses 1 and 3 is not limited to two and two or more information processing apparatuses may also be used. Any number of the information processing apparatuses 1 and 3 may also be used as long as the information processing apparatuses 1 and 3 use the unauthorized use detection system 9 in the data distribution market. In the embodiment, a description will be given with the assumption that the information processing apparatus 1 is an information processing apparatus on the verifier side and the information processing apparatus 3 is an information processing apparatus of a user including an unauthorized user.

The information processing apparatus 1 includes a control unit 10 and a storage unit 20. The information processing apparatus 3 includes a control unit 30 and a storage unit 40.

The control units 10 and 30 correspond to an electronic circuit, such as a central processing unit (CPU). Furthermore, each of the control units 10 and 30 includes an internal memory that stores therein control data and programs in which various kinds of procedures are prescribed, whereby each of the control units 10 and 30 executes various processes. The control unit 10 includes a data processing unit 11, a processing history generating unit 12, and a detecting unit 13. The control unit 30 includes a data processing unit 31 and a processing history generating unit 32.

Each of the storage units 20 and 40 is, for example, a semiconductor memory device, such as a RAM and a flash memory, or a storage device, such as a hard disk and an optical disk. The storage unit 20 includes a track record information database 21 and original data 22. The storage unit 40 includes a track record information database 41 and manipulation data 42.

The track record information databases 21 and 41 hold information on the track record of data transactions executed by the information processing apparatuses 1 and 3, respectively. In the track record information databases 21 and 41, the processing histories 210 and 410 of the data, transaction histories of the data, and the like are included respectively. Furthermore, in the embodiment, in order to focus attention on detection of unauthorized use of the data, a description will be given of a case in which the processing histories 210 and 410 are held in the hash chain 5 as the transaction track record of the data. The processing histories 210 and 410 are generated by the processing history generating units 12 and 32, which will be described later. The data structure of the processing histories 210 and 410 will be described later.

The original data 22 is the original data generated by processing data that is used by the information processing apparatus 1. An example of the original data 22 includes, for example, statistical data, survey data, a customer list, and the like.

The manipulation data 42 is data generated by manipulating the original data 22. Furthermore, in order to explain the unauthorized use detection process, for the purpose of convenience, it is assumed that the manipulation data 42 is manipulated data in case of unauthorized use. However, instead of the manipulation data 42, original data that has not been manipulated may also be stored.

Each of the data processing units 11 and 31 processes data and generates the original data 22 and the manipulation data 42.

The processing history generating units 12 and 32 generate the processing histories 210 and 410 related to the original data 22 and the manipulation data 42, respectively. Furthermore, here, a description will be given of the processing history generating unit 12 that generates the processing history 210. The processing history generating unit 32 performs the same process as that performed by the processing history generating unit 12; therefore, descriptions of the process will be omitted.

For example, the processing history generating unit 12 calculates all of the hash values of the original data 22. Furthermore, the processing history generating unit 12 calculates hash values with respect to a plurality of partial areas calculated in accordance with a specific procedure. The specific procedure mentioned here is a process of deciding starting offset in a plurality of partial areas by using a one-way function based on all of the hash values of the original data 22 and a predetermined numerical value. Furthermore, when the offset exceeds the entire size of the original data 22, the offset may also return to the top of the original data 22. The predetermined numerical value is denoted by, for example, k and is a prime number that satisfies k≤N/n (N: the size of data, n: the number of partial areas for each k). As an example, based on all of the hash values of the original data 22 and k, the processing history generating unit 12 concatenates n 1-byte partial areas at intervals of k bytes starting from the offset decided by the one-way function, constitutes an area, and calculates a hash value of each of the partial areas. Then, the processing history generating unit 12 constitutes areas with respect to all of the prime numbers k that satisfy k≤N/n and calculates a hash value of each of the partial areas. Then, the processing history generating unit 12 generates the processing history 210 with respect to the original data 22 including all of the hash values and the hash values with respect to all of the prime numbers k.

Furthermore, the processing history generating unit 12 stores the generated processing history 210 in the hash chain 5.

Furthermore, the reason for using the one-way function is to make inverted calculation difficult. Namely, with the one-way function, the offset is calculated based on all of the hash values and k but all of the hash values and k are not easily calculated. Furthermore, the reason for using the prime number is to avoid an overlap between the position of the partial area constituted by k and the position of the partial area constituted by another k. The reason for using a plurality of prime numbers is to verify a plurality of different areas.

Figure 2:
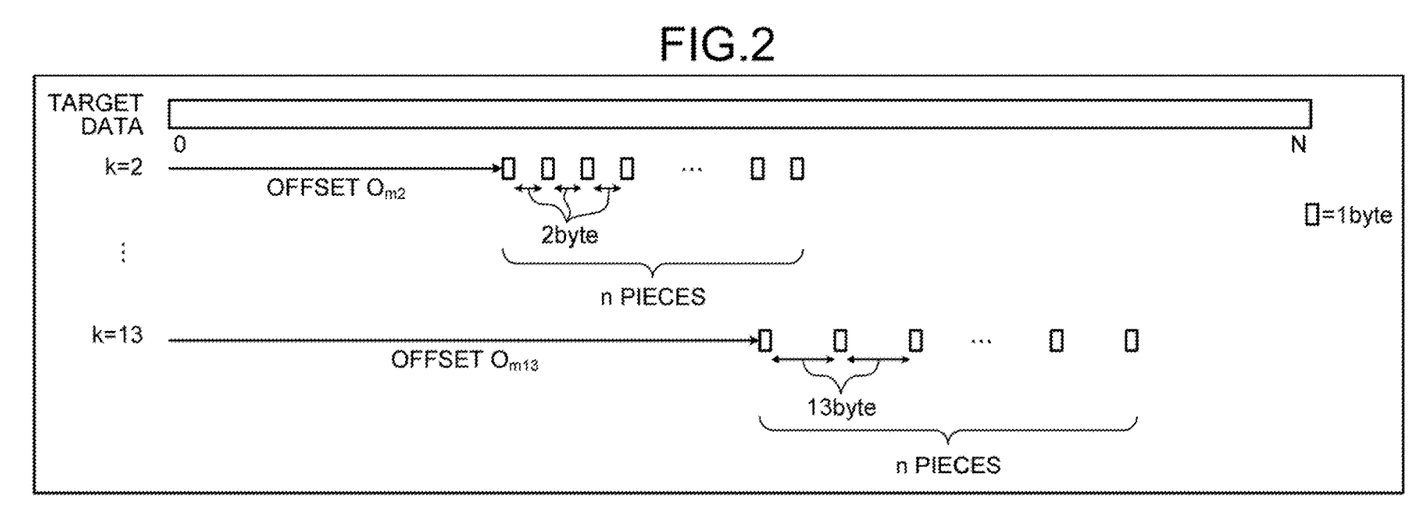
FIG. 2 is a diagram illustrating a process of generating a processing history according to the embodiment.

Here, generating a processing history according to the embodiment will be described with reference to FIG. 2. FIG. 2 is a diagram illustrating a process of generating a processing history according to the embodiment. As illustrated in FIG. 2, N-byte target data from which the processing history 210 is generated is illustrated. Furthermore, n is the number of a plurality of partial areas decided for each k.

For example, the processing history generating unit 12 calculates all of the hash values of the target data.

Then, the processing history generating unit 12 calculates the prime number k that satisfies less than or equal to N/n. Here, it is assumed that k is 2, . . . , and 13.

Then, the processing history generating unit 12 decides the top offset of the plurality of partial areas by using the one-way function based on all of the hash values of the target data and k. Then, the processing history generating unit 12 concatenates n 1-byte partial areas at intervals of k bytes from the decided offset, constitutes an area, and calculates a hash value of each of the partial areas.

As an example, when k is "2", the processing history generating unit 12 decides the starting offset $O_{m2}$ in the plurality of partial areas by using the one-way function based on all of the hash values of the target data and based on "2" as k. Then, the processing history generating unit 12 concatenates n 1-byte partial areas at intervals of "2" bytes starting from the decided offset $O_{m2}$, constitutes the areas, and calculates a hash value of each of the partial areas.

Furthermore, as an example, when k is "13", the processing history generating unit 12 decides the starting offset $O_{m13}$ in the plurality of partial areas by using the one-way function based on all of the hash values of the target data and based on "13" as k. Then, the processing history generating unit 12 concatenates n 1-byte partial areas at intervals of "13" bytes from the decided offset $O_{m13}$, constitutes the areas, and calculates a hash value of each of the partial areas.

Then, the processing history generating unit 12 constitutes an area with respect to each of the calculated prime numbers k and calculates a hash value of each of the partial areas. Then, the processing history generating unit 12 generates the processing history 210 with respect to the target data including all of the hash values and the hash values with respect to all of the prime numbers k. Then, the processing history generating unit 12 scores the generated processing history 210 in the hash chain 5.

Figure 3:
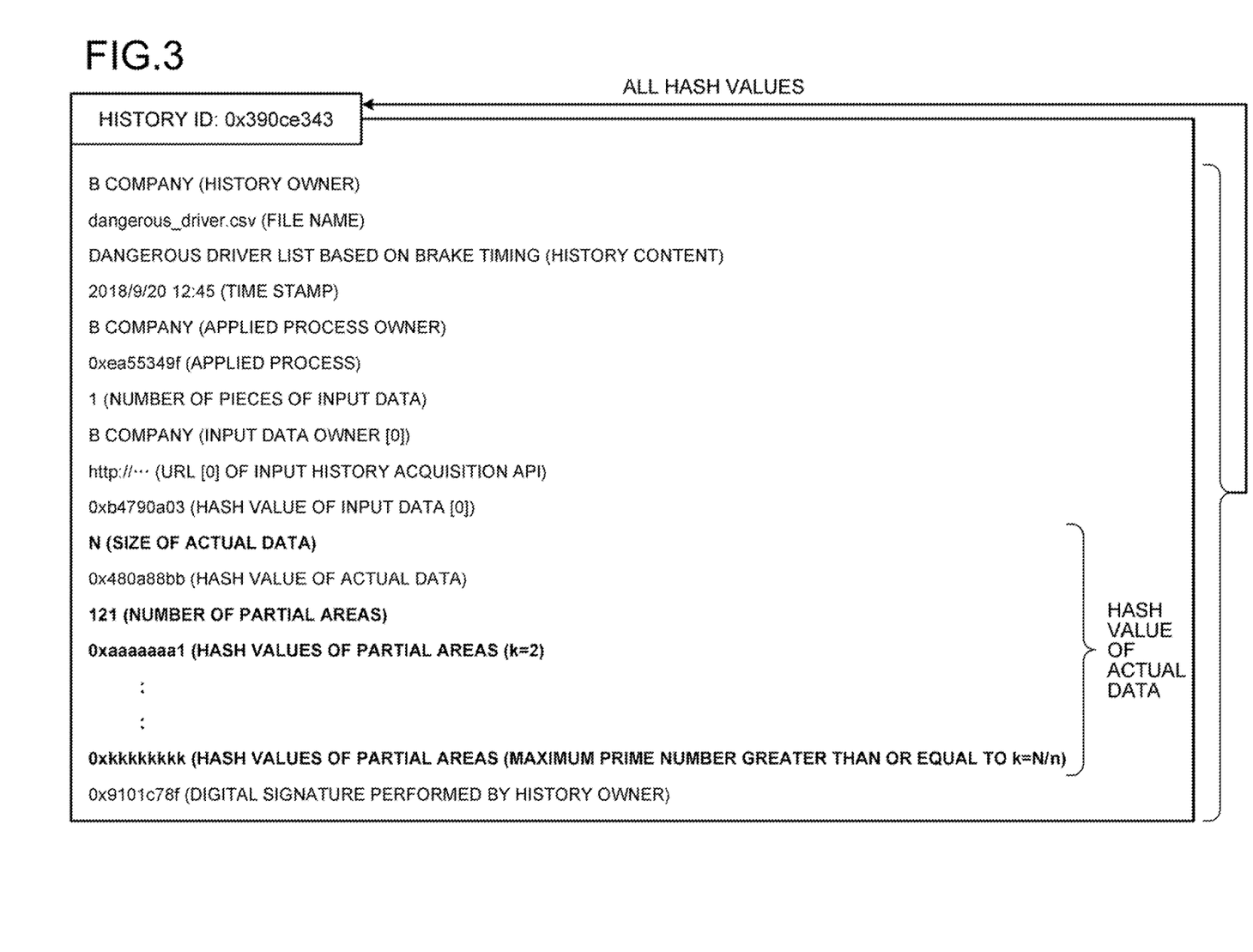
FIG. 3 is a diagram illustrating an example of a data structure of the processing history according to the embodiment.

Here, the data structure of the processing histories 210 and 410 according to the embodiment will be described with reference to FIG. 3. FIG. 3 is a diagram illustrating an example of the data structure of the processing history according to the embodiment. Furthermore, the processing histories 210 and 410 have the same data structure; therefore, the processing history 210 will be described and the description of the processing history 410 will be omitted.

As illustrated in FIG. 3, the processing history 210 includes a history owner, a file name, history content, and a time stamp. In addition, the processing history 210 includes the number of pieces of input data, an input data owner "0", the URL "0" of an input history acquisition API, and a hash value of the input data "0". Furthermore, the hash value of all of the pieces of information on the processing history 210 is added as a history ID. The input data mentioned here is the most recent data concatenated by a hash chain. For example, the processing history of the input data "0" that indicates the most recent data is acquired by the input history acquisition API that is present in the URL of the input history acquisition API. Namely, because the processing history 210 is stored in the hash chain 5, it is possible to track a distribution channel of the data. Namely, this is useful for traceability of the data. The information on the hash value of the input data and the like is set in the processing history of the actual data in the current target data. Furthermore, the content of the processing history 210 that is useful for traceability of the above described data is known by a block chain technology; therefore, descriptions thereof in detail is omitted.

In addition, the processing history 210 includes a hash value of actual data. The hash value of the actual data includes the size of the actual data, the hash value of the actual data, the number of partial areas, and the hash values of the partial areas corresponding to the number of partial areas. The size of the actual data indicates the entire size of the processed data. The hash value of the actual data indicates the hash value calculated from all of the pieces of the processed data. The number of partial areas indicates the total number of the partial areas in which a hash value is calculated for each prime number. The hash value of the partial areas corresponding to the number of partial areas indicates the hash value calculated for each partial area corresponding to the number of partial areas.

As an example, when the history ID is "0x390ce343", a "B company" is stored as the history owner, "dangerous_driver.csv" is stored as a file name, a "dangerous driver list based on brake timing" is stored as the history content, and "2018/9/20 12:45" is stored as the time stamp. Furthermore, "1" is stored as the number of the number of pieces of the input data, the "B company" is stored as the input data owner "0", "http:// . . . " is stored as the URL "0" of the input history acquisition API, and "0xb4790a03" is stored as the hash value of the input data "0". In addition, "N" is stored as the size of the actual data, "0x480a88bb" is stored as the hash value of the actual data, "121" is stored as the number of the partial areas, "0xaaaaaaa1" is stored as the hash value of the partial area (k=2), . . . , and "0xkkkkkkkk" is stored as the hash value of the partial area (the maximum prime number greater than or equal to k=N/n). Furthermore, "0x9101c78f" is stored as the digital signature performed by the history owner.

A description will be given here by referring back to FIG. 1. The detecting unit 13 detects unauthorized use of the data. The detecting unit 13 includes a readout unit 131, a calculating unit 132 and a comparing unit 133.

The readout unit 131 reads out the processing history 410 associated with the questionable data from the hash chain 5. For example, the readout unit 131 calculates the hash values of entire questionable data and reads out the processing history 410 having the hash value of the actual data that matches the calculated hash value.

Regarding the target data that is likely to be used in an unauthorized manner, the calculating unit 132 calculates the hash values with respect to the plurality of partial areas calculated in accordance with the specific procedure using the processing history 410 of the questionable data. The specific procedure mentioned here is a process of deciding starting offset of a plurality of partial areas by using the one-way function based on all of the hash values of the questionable data and k. Furthermore, when the offset exceeds the entire size of the questionable data, the offset may also return to the top of the subject data. Here, k is the prime number that satisfies k≤N/n (N: the size of data, n: the number of partial areas for each k). As an example, the calculating unit 132 extracts the hash values of the entire questionable data (hash values of the actual data) and the size of the actual data from the read processing history 410. The calculating unit 132 decides offset with respect to k by using the one-way function based on the hash values of the entire questionable data (hash values of the actual data) and based on k obtained from the size of the actual data. The calculating unit 132 applies the decided offset to the target data. Namely, regarding the target data, from the decided offset, the calculating unit 132 concatenates n 1-byte partial areas at intervals of k bytes, constitutes an area, and calculates a hash value of each of the partial areas. Then, the calculating unit 132 constitutes areas with respect to all of the prime numbers k and calculates a hash value of each of the partial areas. Namely, the calculating unit 132 uses the processing history 410 associated with the questionable data, obtains the starting offset of the partial area with respect to k of the subject data, and calculates the hash values of the partial areas starting from the same position as the position of the questionable data in the target data that is likely to be used in an unauthorized manner.

Consequently, the calculating unit 132 sets the starting offset of the partial area to the value that depends on the content of the manipulation data 42, whereby it is difficult for the manipulation side to manipulate and estimate the offset of the meaning partial areas (partial areas targeted for calculation of hash values). Namely, if the manipulation side can estimate the position of the partial area targeted for calculation of the hash values, the manipulation side can make false statement indicating un-manipulated original data by manipulating the partial area at that position. However, by applying the offset that depends on the content of the manipulation data 42 to the original data 22, it is difficult to manipulate and estimate the offset of the meaning partial area. Furthermore, by randomly setting the offset of the partial area in which the hash values are calculated instead of setting the offset in a fixed manner, the calculating unit 132 can make the position to be verified hide. Furthermore, by constituting the partial area in a cycle of a plurality of different intervals k, the calculating unit 132 can prevent the manipulation side from narrowing down the target of manipulation.

Furthermore, it has been described that, regarding the target data that is likely to be used in an unauthorized manner, the calculating unit 132 calculates hash values of the plurality of partial areas obtained from the specific procedure by using the processing history 410 associated with the questionable data. However, the calculating unit 132 is not limited to this. Regarding the questionable data, the calculating unit 132 may also calculate hash values with respect to the plurality of partial areas obtained from the specific procedure by using the processing history 210 associated with the target data that is likely to be used in an unauthorized manner.

The comparing unit 133 compares the hash values with respect to the plurality of partial areas included in the processing history 410 associated with the questionable data with the hash values with respect to the plurality of partial areas calculated for the target data that is likely to be used in an unauthorized manner. For example, for each k, regarding a hash value of each of n partial areas at intervals of k bytes starting from the offset associated with k, the comparing unit 133 compares questionable data with the target data that is likely to be used in an unauthorized manner.

Furthermore, the comparing unit 133 uses the comparison result and determines whether the questionable data has been used in an unauthorized manner. For example, when the same comparison result is greater than or equal to a predetermined match level, the comparing unit 133 determines that the questionable data is used in an unauthorized manner. When the same comparison result is less than the predetermined match level, the comparing unit 133 determines that the same questionable data is not used in an unauthorized manner. The predetermined match level may be, for example, 50%, 60%, or 40%. Namely, any predetermined match level may also be used as long as the predetermined match level can be assumed to be unauthorized used. Consequently, by performing calculation of the hash values representing the characteristics of the original data 22 on the plurality of partial areas, even when a part of the original data 22 is manipulated, the possibility of obtaining identical hash values as a whole is higher as the manipulate portion is smaller.

Sequence of the Unauthorized Use Detection Process

Figure 4:
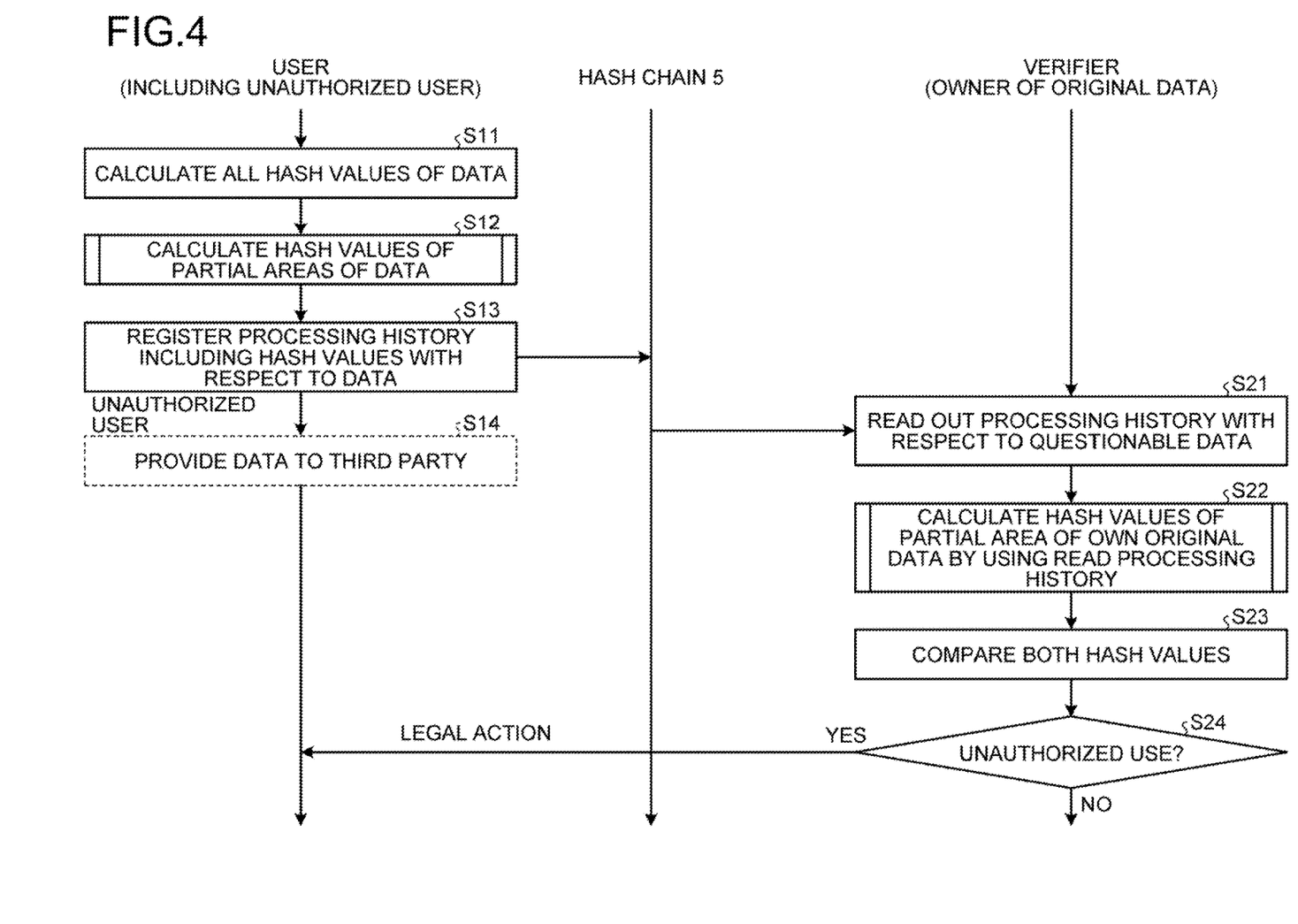
FIG. 4 is a diagram illustrating an example of a sequence of an unauthorized use detection process according to the embodiment.

FIG. 4 is a diagram illustrating an example of a sequence of an unauthorized use detection process according to the embodiment. Furthermore, it is assumed that the information processing apparatus 1 is an information processing apparatus on the verifier side. It is assumed that the information processing apparatus 3 is an information processing apparatus held by a user including an unauthorized user.

On the user side, the information processing apparatuses 1 and 3 calculate all of the hash values of the data (Step S11). For example, the information processing apparatus X calculates all of the hash values of the original data 22. The information processing apparatus 3 calculates all of the hash values of the manipulation data 42 in which the original data 22 is manipulated.

Then, the information processing apparatuses 1 and 3 calculates the hash values of the partial area of the data (Step S12). For example, the information processing apparatus 1 calculates the hash values of the partial area of the original data 22. The information processing apparatus 3 calculates the hash values of the partial area of the manipulation data 42. As an example, the information processing apparatuses 1 and 3 calls a calculating process of the hash value of the partial area of the data by using the data size N of the own data, all of the hash values of the own entire data, and the own data as parameters. Furthermore, the flowchart of calculating process of the hash values of the partial area of the data will be described later.

Then, the information processing apparatuses 1 and 3 registers the processing history including the hash values with respect to the data (Step S13). For example, the information processing apparatus 1 registers the processing history 210 including the calculated hash values of the partial area with respect to the original data 22 into the hash chain 5. The information processing apparatus 3 registers the processing history 410 including the calculated hash values of the partial area with respect to the manipulation data 42 into the hash chain 5.

Here, it is assumed that an unauthorized user provides the manipulation data 42 in which the original data 22 has been manipulate to the third party (Step S14).

On the verifier side, the information processing apparatus 1 reads out the processing history 410 with respect to the questionable data (the manipulation data 42) from the hash chain 5 (Step S21). Then, the information processing apparatus 1 calculates the hash values of the partial area of the own original data 22 by using the read processing history 410 (Step S22). As an example, the information processing apparatus 1 calls the calculating process of the hash values of the partial area of the data by using the data size N of the data and hash values of the entire data included in the processing history 410, and the own original data 22 as parameters. Furthermore, the flowchart of the calculating process of the hash values of the partial area of the data will be described later.

Then, the information processing apparatus 1 compares the calculated hash values of the partial area related to the own original data 22 with the hash values of the partial area that is set related to the questionable data in the processing history 410 (Step S23).

Then, the information processing apparatus 1 determines, by using the comparison result, whether the questionable data is used in an unauthorized manner (Step S24). For example, the information processing apparatus 1 determines whether the questionable data is used in an unauthorized manner by determining whether the identical comparison result is greater than or equal to the predetermined match level. When it is determined that the questionable data is not used in an unauthorized manner (No at Step S24), the information processing apparatus 1 ends the unauthorized use detection process.

In contrast, when it is determined that the questionable data is used in an unauthorized manner (Yes at Step S24), the corporation associated with the information processing apparatus 1 takes a legal action against the corporation of the information processing apparatus 3 associated with the questionable data.

Figure 5:
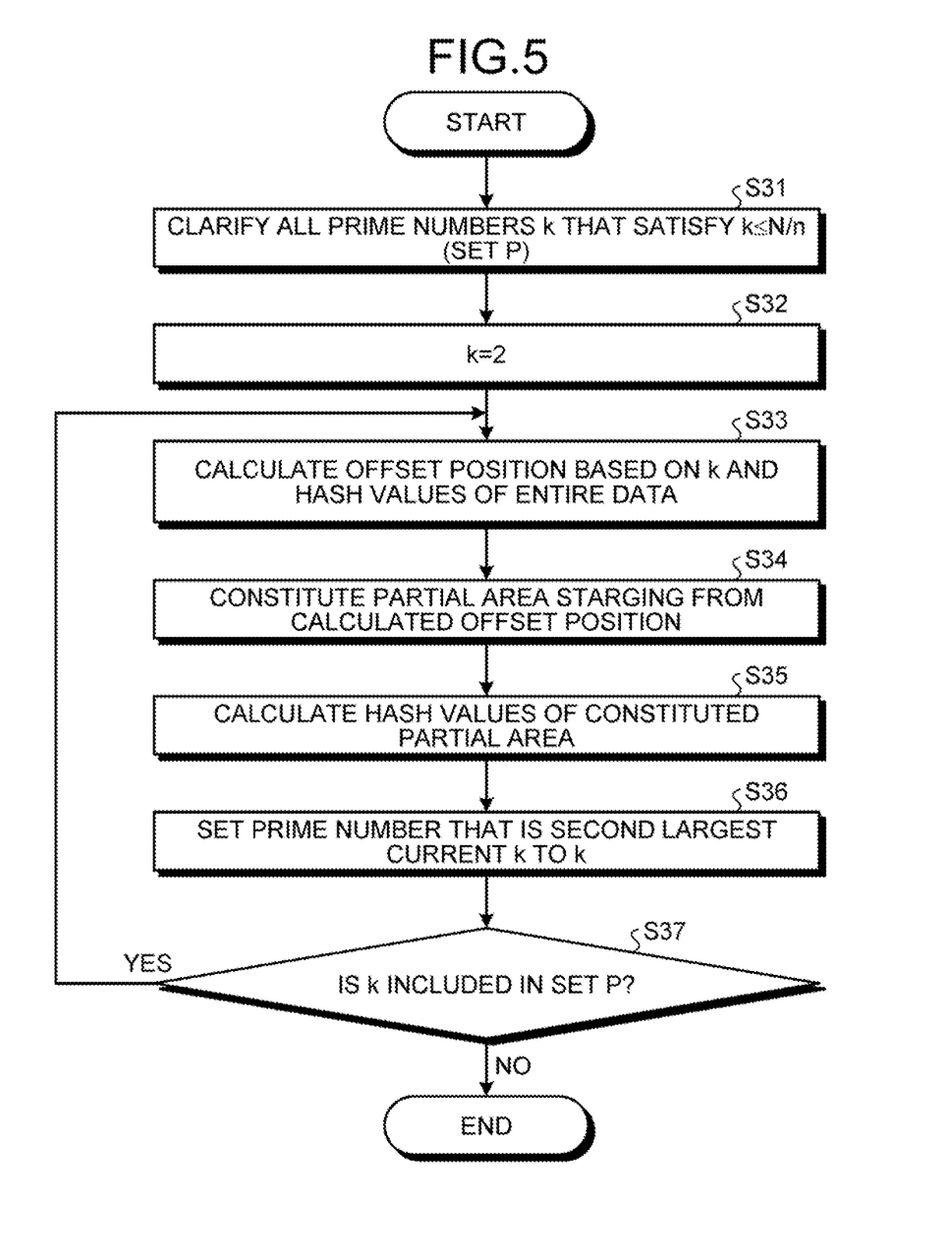
FIG. 5 is a flowchart illustrating an example of the flow of a process of calculating a hash value in a partial area.

Flowchart of the Flow of the Process of
Calculating Hash Values of the Partial Area FIG. 5 is a flowchart illustrating an example of the flow of a process of calculating hash value of partial areas. Furthermore, in FIG. 5, a process of calculating the hash values of the partial areas (hereinafter, referred to as a "calculating process") receives the data size N of the data, the hash values of the entire data, and the data as parameters.

Furthermore, the calculating process corresponds to the process included in the processing history generating units 12 and 32 or the calculating unit 132.

The calculating process clarifies all of the prime numbers k that satisfy the value greater than or equal to N/n and input the obtained result to a set P (Step S31). First, the calculating process sets the prime number "2" into k (Step S32).

Then, the calculating process calculates the position of the offset with respect to k based on k and the hash values of the entire data (Step S33). For example, the calculating process calculates the offset with respect to k by using the one-way function based on k and the hash values of the entire data.

Then, the calculating process constitutes a partial area starting from the calculated position of the offset (Step S34). For example, regarding the received data, starting from the calculated offset position, the calculating process constitutes n 1-byte partial areas at intervals of k bytes.

Then, the calculating process calculates the hash values of the constituted partial area (Step S35). For example, the calculating process calculates each of the hash values of the constituted n 1-byte partial areas.

Then, the calculating process sets a prime number that is the second largest current k into k (Step S36). Then, the calculating process determines whether k is included in the set P (Step S37). When it is determined that k is included in the set P (Yes at Step S37), the calculating process proceeds to Step S33 in order to perform the process associated with the next prime number k.

In contrast, when it is determined that k is not included in the set P (No at Step S37), the calculating process ends the process and returns to the call source.

Here, when the sequence of the unauthorized use detection process according to the embodiment is applied to the FIG. 7, it is assumed that the Q company manipulates the original data 22 of the Y company. The information processing apparatus 3 held by the Q company calculates hash values of the partial areas of the manipulation data 42 and registers the processing history 410 including the calculated hash values of the partial areas into the hash chain 5. Then, the Q company provides the manipulation data 42 to the Z company. The Y company that has looked the manipulation data 42 doubts whether the manipulation data 42 may be the original data 22 of the own company that is used in an unauthorized manner. Then, the information processing apparatus 1 held by the Y company reads out the processing history 410 with respect to the questionable data from the hash chain 5 and calculates the hash values of the partial area of the own original data 22 by using the processing history 410 with respect to the questionable data. Then, the information processing apparatus 1 compares both of the hash values and, when the identical comparison results are greater than or equal to the predetermined match level, the Y company held by the information processing apparatus 1 takes a legal action against the Q company (or the Z company) held by the information processing apparatus 3 associated with the questionable data.

Consequently, when the original data 22 of the Y company is distributed to the P company, it is possible for the Y company to check an illegal act, such as a case in which the manipulation data 42 in which the original data 22 is manipulated is sold to the Z company from the P company through the Q company, and it is possible to avoid opportunity loss of the own company.

Furthermore, there may be a case in which the unauthorized user side performs manipulation, such as a case of, for example, inserting space of few bytes at the top of the original data 22 (shifts the offset). In this case, even when the calculating unit 132 calculates the offset based on all of the hash values of the processing history 410 associated with the manipulation data 42 and k, the position of the calculated offset shifts to the position associated with the original data 22. Thus, the calculating unit 132 concatenates n 1-byte partial areas at intervals of k bytes by shifting the calculated offset $O_m$ by 1 byte at a time from the shifted offset $O_m+p_{off}$, constitutes an area, and calculates a hash value of each of the partial areas. Furthermore, $p_{off}$ is 0 byte, 1 byte, 2 bytes, . . . , and $O_m-1$. Then, the comparing unit 133 compares, for each k, from the offset $O_m+p_{off}$ associated with k, regarding each of the hash values of the n partial areas at intervals of k bytes, the hash values in the questionable data in the processing history 410 and the hash values in the original data 22 that is likely to be used in an unauthorized manner. Then, when identical comparison results are greater than or equal to the predetermined match level in one of $p_{off}$, the comparing unit 133 determines that the questionable data has been used in an unauthorized manner. When identical comparison results are less than the predetermined match level in all $p_{off}$, the comparing unit 133 determines that the questionable data is not used in an unauthorized manner. Consequently, even when the unauthorized user side manipulates conduct, such as shifting the offset, it is possible to detect unauthorized use.

Effects of the Embodiment

According to the embodiment described above, the unauthorized use detection system 9 includes the hash chain 5 and the information processing apparatuses 1 and 3. The hash chain 5 records, for each data, the data structure that includes the hash values of the entire data and the hash values calculates with respect to the plurality of partial areas that are obtained from the specific procedure using the hash values of the entire data. The information processing apparatus 1 reads out the data structure associated with the data of one of comparison targets from the hash chain 5. The information processing apparatus 1 calculates, regarding the data of the other one of the comparison targets, hash values with respect to the plurality of partial areas obtained from the specific procedure using the hash values of the entire data included in the data structure that is associated with the data of the other one of the comparison targets. The information processing apparatus 1 compares the hash values with respect to the plurality of partial areas included in the data structure of the one of the comparison targets with the hash values with respect to the plurality of partial areas related to the other one of the comparison targets. With this configuration, the information processing apparatus 1 can detect unauthorized use in a data distribution market. For example, the information processing apparatus 1 calculates the hash values, which represents the characteristics of the original data 22, with respect to the plurality of partial areas, whereby, even when a part of the original data 22 is manipulated, the possibility of obtaining identical hash values as a whole is higher as the manipulate portion is smaller. Consequently, the information processing apparatus 1 can detect unauthorized use of the original data 22.

Furthermore, according to the embodiment described above, the information processing apparatus 1 calculates offset by using a predetermined one-way function based on the hash values of the entire data included in the data structure associated with the data of the one of the comparison targets and based on the predetermined numerical value. The information processing apparatus 1 calculates, regarding the data of the other comparison target, the hash values with respect to the plurality of partial areas starting from the offset. With this configuration, for example, the information processing apparatus 1 applies the offset on the manipulation data side (the one of the comparison targets) to the offset on the original data 22 side (the other one of the comparison targets) and sets the applied offset as the starting offset of the partial area to be verified. Consequently, it is difficult for the manipulation data side to manipulate the data and estimate the starting offset of the meaning partial area (the partial area targeted for calculating hash values). In other words, by randomly setting the offset of the partial area in which the hash values are calculated instead of setting the offset in a fixed manner, the information processing apparatus 1 can make the position to be verified hide.

Furthermore, according to the embodiment described above, the information processing apparatus 1 further calculates, regarding the data of the other comparison target, the hash values with respect to partial data of the plurality of partial areas that is obtained by shifting the calculated offset by predetermined bytes. With this configuration, for example, even when the unauthorized user side (the one comparison target) manipulates an act, such as shifting the offset, the information processing apparatus 1 can detect unauthorized use.

Furthermore, according to the embodiment described above, the predetermined numerical value is a prime number that is smaller than the size of the entire data. Consequently, it is possible to prevent the position of the plurality of partial areas corresponding to the verification position from being overlapped.

Furthermore, according to the embodiment described above, the predetermined numerical value is plural. Consequently, by using the plurality of predetermined numerical values, the information processing apparatus 1 can set a larger number of positions of the plurality of partial areas functioning as the verification positions. In other words, for example, by constituting the partial areas in a cycle of a plurality of different intervals k, the information processing apparatus 1 can prevent the manipulation side from narrowing down the target of manipulation.

Others

Furthermore, in the embodiment, the components of each unit in the information processing apparatus 1 illustrated in the drawings are not always physically configured as illustrated in the drawings. Specifically, all or part of the device can be configured by functionally or physically separating or integrating any of the units depending on various loads or use conditions. For example, the readout unit 131 and the calculating unit 132 may also be integrated as a single unit. In contrast, the calculating unit 132 may also be separated into a calculating unit that calculates k, a calculating unit that calculates offset associated with k, and a calculating unit that calculates hash values of the partial area starting from the offset. Furthermore, the track record information database 21 may also be connected as an external device of the information processing apparatus 1 or may also be connected via a network.

Figure 6:
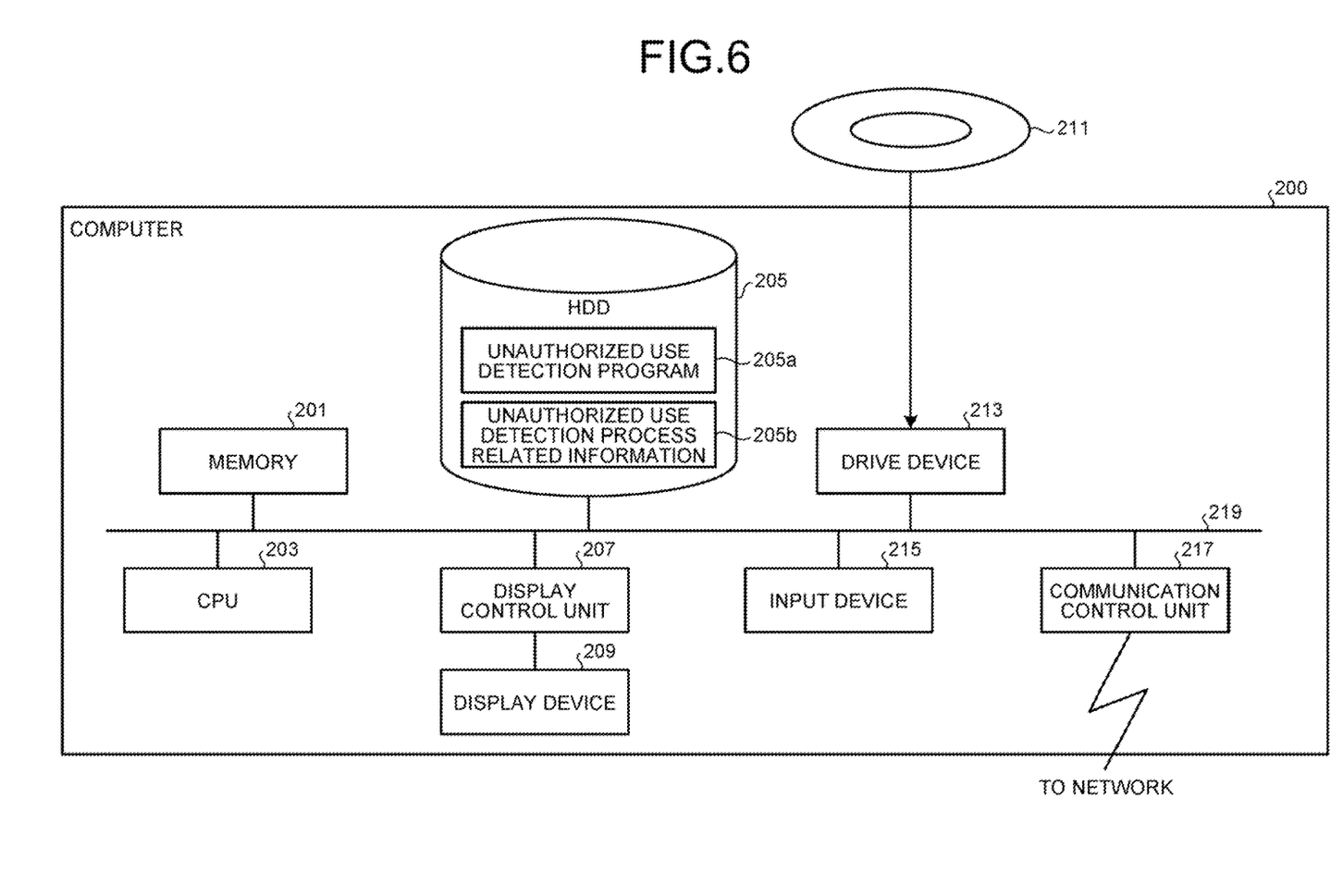
FIG. 6 is a diagram illustrating an example of a computer that executes an unauthorized use detection program.

Furthermore, the various processes described above in the embodiments can be implemented by a program prepared in advance and executed by a computer, such as a personal computer or a workstation. Accordingly, in the following, an example of a computer that executes an unauthorized use detection program that implements the same function as that performed by the information processing apparatus 1 illustrated in FIG. 1 will be described. FIG. 6 is a diagram illustrating an example of a computer that executes an unauthorized use detection program.

As illustrated in FIG. 6, a computer 200 includes a CPU 203 that executes various kinds of arithmetic processing, an input device 215 that receives an input of data a user, and a display control unit 207 that controls a display device 209. Furthermore, the computer 200 includes a drive device 213 that reads programs or the like from a storage medium and a communication control unit 217 that sends and receives data to and from other computers via the network. Furthermore, the computer 200 includes a memory 201 that temporarily stores therein various kinds of information and an HDD 205. Furthermore, the memory 201, the CPU 203, the HDD 205, the display control unit 207, the drive device 213, the input device 215, and the communication control unit 217 are connected by a bus 219.

The drive device 213 is a device for, for example, a removable disk 211. The HDD 205 stores therein an unauthorized use detection program 205a and unauthorized use detection process related information 205b.

The CPU 203 reads out the unauthorized use detection program 205a, loads the program in the memory 201, and executes the program as a process. The process corresponds to each of the functioning units included in the information processing apparatus 1. The unauthorized use detection process related information 205b corresponds to the track record information database 21 and the original data 22. Then, for example, the removable disk 211 stores therein each of the pieces of information, such as the unauthorized use detection program 205a.

Furthermore, the unauthorized use detection program 205a is not always stored in the HDD 205 from the beginning. For example, the program is stored in a "portable physical medium", such as a flexible disk (FD), a CD-ROM, a DVD disk, a magneto-optic disk, an IC CARD, or the like, that is to be inserted into the computer 200. Then, the computer 200 may also read out and execute the unauthorized use detection program 205a from the portable physical medium.

According to an aspect of an embodiment, it is possible to detect unauthorized use of data in the data distribution market.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An unauthorized use detection system comprising:
a hash chain that records, for each piece of data, a data structure that includes a hash value of entire data and hash values calculated with respect to a plurality of partial areas obtained at intervals of a predetermined number from the data, the predetermined number being obtained from a specific procedure using the hash value of the entire data; and
a server, wherein
the server comprising:
a processor; and
a memory, wherein the processor executes a process including:
reading out a data structure associated with data of one of comparison targets from the hash chain,
calculating, regarding data of the other one of the comparison targets, hash values with respect to the plurality of partial areas obtained at intervals of the predetermined number from the data, the predetermined number being obtained from the specific procedure using a hash value of the entire data included in the data structure associated with the data of the one of the comparison targets, and
comparing the hash values of the plurality of partial areas obtained at intervals of the predetermined number included in the data structure of the one of the comparison targets with the calculated hash values of the plurality of partial areas obtained at intervals of the predetermined number related to the other one of the comparison targets, wherein the calculating includes
first calculating top offset of the plurality of partial areas by using a predetermined one-way function based on the hash value of the entire data included in the data structure associated with the data of the one of the comparison targets and based on a predetermined numerical value calculated from size of the data and number of the plurality of partial areas, and
second calculating, regarding the data of the other one of the comparison targets, the hash values of the plurality of partial areas starting from the offset calculated at the first calculating.

2. The unauthorized use detection system according to claim 1, wherein the second calculating further calculates, regarding the data of the other one of the comparison targets, hash values of a plurality of partial areas obtained by shifting the offset calculated at the first calculating by a predetermined byte.

3. The unauthorized use detection system according to claim 1, wherein the predetermined numerical value is a prime number that is smaller than the size of the entire data.

4. The unauthorized use detection system according to claim 3, wherein the predetermined numerical value is plural.

5. An information processing apparatus comprising:
a processor:
a memory, wherein the processor executes a process comprising:
reading out, for each piece of data from a hash chain, a data structure that includes a hash value of entire data and hash values calculated with respect to a plurality of partial areas obtained from a specific procedure using the hash value of the entire data and that is associated with data of one of comparison targets;
calculating, regarding data of the other one of the comparison targets, hash values with respect to the plurality of partial areas obtained at intervals of a predetermined number from the data, the predetermined number being obtained from the specific procedure using the hash value of the entire data included in the data structure associated with the data of the one of the comparison targets; and
comparing the hash values of the plurality of partial areas obtained at intervals of the predetermined number included in the data structure of the one of the comparison targets with the calculated hash values of the plurality of partial areas obtained at intervals of the predetermined number related to the other one of the comparison targets, wherein the calculating includes first calculating top offset of the plurality of partial areas by using a predetermined one-way function based on the hash value of the entire data included in the data structure associated with the data of the one of the comparison targets and based on a predetermined numerical value calculated from size of the data and number of the plurality of partial areas, and second calculating, regarding the data of the other one of the comparison targets, the hash values of the plurality of partial areas starting from the offset calculated at the first calculating.

6. A non-transitory computer-readable recording medium having stored therein an unauthorized use detection program that causes a computer to execute a process comprising:

reading out, for each piece of data from a hash chain, a data structure that includes a hash value of entire data and hash values calculated with respect to a plurality of partial areas obtained from a specific procedure using the hash value of the entire data and that is associated with data of one of comparison targets;

calculating, regarding data of the other one of the comparison targets, hash values with respect to the plurality of partial areas obtained at intervals of a predetermined number from the data, the predetermined number being obtained from the specific procedure using the hash value of the entire data included in the data structure associated with the data of the one of the comparison targets; and comparing the hash values of the plurality of partial areas obtained at intervals of the predetermined number included in the data structure of the one of the comparison targets with the calculated hash values of the plurality of partial areas obtained at intervals of the predetermined number related to the other one of the comparison targets, wherein the calculating includes first calculating top offset of the plurality of partial areas by using a predetermined one-way function based on the hash value of the entire data included in the data structure associated with the data of the one of the comparison targets and based on a predetermined numerical value calculated from size of the data and number of the plurality of partial areas, and second calculating, regarding the data of the other one of the comparison targets, the hash values of the plurality of partial areas starting from the offset calculated at the first calculating.

7. An unauthorized use detection method executed by a computer, the method comprising:

reading out, for each piece of data from a hash chain, a data structure that includes a hash value of entire data and hash values calculated with respect to a plurality of partial areas obtained from a specific procedure using the hash value of the entire data and that is associated with data of one of comparison targets;

calculating, regarding data of the other one of the comparison targets, hash values with respect to the plurality of partial areas obtained at intervals of a predetermined number from the data, the predetermined number being obtained from the specific procedure using the hash value of the entire data included in the data structure associated with the data of the one of the comparison targets; and comparing the hash values of the plurality of partial areas obtained at intervals of the predetermined number included in the data structure of the one of the comparison targets with the calculated hash values of the plurality of partial areas obtained at intervals of the predetermined number related to the other one of the comparison targets, wherein the calculating includes first calculating top offset of the plurality of partial areas by using a predetermined one-way function based on the hash value of the entire data included in the data structure associated with the data of the one of the comparison targets and based on a predetermined numerical value calculated from size of the data and number of the plurality of partial areas, and second calculating, regarding the data of the other one of the comparison targets, the hash values of the plurality of partial areas starting from the offset calculated at the first calculating.

* * * * *